United States Patent
Bauer et al.

(10) Patent No.: US 7,122,077 B2
(45) Date of Patent: Oct. 17, 2006

(54) INKJET INK SET AND METHOD OF USING SAME

(75) Inventors: Richard Douglas Bauer, Kennett Square, PA (US); Clarence Gaetano Hermansky, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 182 days.

(21) Appl. No.: 10/801,466

(22) Filed: Mar. 16, 2004

(65) Prior Publication Data

US 2005/0030360 A1 Feb. 10, 2005

Related U.S. Application Data

(60) Provisional application No. 60/458,483, filed on Mar. 28, 2003.

(51) Int. Cl.
*C09D 11/02* (2006.01)
*G01D 11/00* (2006.01)

(52) U.S. Cl. .................. 106/31.27; 106/31.6; 347/100

(58) Field of Classification Search ............. 106/31.27, 106/31.6
See application file for complete search history.

(56) References Cited

U.S. PATENT DOCUMENTS

| | | | |
|---|---|---|---|
| 5,026,427 A | 6/1991 | Mitchell et al. | |
| 5,086,698 A | 2/1992 | Wirz | |
| 5,141,556 A | 8/1992 | Matrick | |
| 5,169,436 A | 12/1992 | Matrick | |
| 5,698,016 A | 12/1997 | Adams et al. | |
| 5,700,314 A * | 12/1997 | Kurbayashi et al. | 106/31.27 |
| 5,746,818 A | 5/1998 | Yatake | |
| 5,932,631 A | 8/1999 | Marritt et al. | |
| 6,160,370 A | 12/2000 | Ohnuma | |
| H1967 H | 6/2001 | Woolf | |
| 6,450,632 B1 | 9/2002 | Tsang et al. | |
| 2001/0003263 A1 | 6/2001 | Johnson et al. | |
| 2001/0004871 A1 | 6/2001 | Johnson et al. | |
| 2002/0044185 A1 | 4/2002 | Koitabashi et al. | |
| 2002/0056403 A1 | 5/2002 | Johnson et al. | |
| 2003/0069329 A1* | 4/2003 | Kubota et al. | 523/160 |
| 2003/0103121 A1* | 6/2003 | Tomioka et al. | 347/100 |
| 2004/0024083 A1* | 2/2004 | Lee | 523/160 |

FOREIGN PATENT DOCUMENTS

| | | |
|---|---|---|
| EP | 1 148 104 | 4/2001 |
| EP | 1 258 510 | 11/2002 |
| EP | 1 258 510 A1 | 11/2002 |
| WO | WO 84/01684 | 4/1984 |
| WO | WO 99/29789 | 6/1999 |
| WO | WO 02/36696 | 5/2002 |

OTHER PUBLICATIONS

The International Search Report (PCT/US2004/009184) dated Apr. 10, 2004.

* cited by examiner

*Primary Examiner*—J. A. Lorengo
*Assistant Examiner*—Veronica F. Faison

(57) ABSTRACT

This invention pertains to an ink set for inkjet printing, in particular to an ink set comprising at least one ink comprising colorant and nonaqueous vehicle; and
a fixing fluid comprising fixing agent and aqueous vehicle. The invention also pertains to a method of inkjet printing with this ink set.

19 Claims, No Drawings

INKJET INK SET AND METHOD OF USING SAME

CROSS-REFERENCE TO RELATED APPLICATIONS

This application claims priority under 35 U.S.C. §119 from U.S. Provisional Application Ser. No. 60/458,483 (filed Mar. 28, 2003), the disclosure of which is incorporated by reference herein for all purposes as if fully set forth.

BACKGROUND OF THE INVENTION

This invention pertains to an ink set for inkjet printing, in particular to an ink set comprising at least one nonaqueous ink and at least one aqueous fixer fluid. The invention also pertains to a method of inkjet printing with this ink set.

Inkjet printing is a non-impact printing process in which droplets of ink are deposited on print media, such as paper, to form the desired image. The droplets are ejected from a printhead in response to electrical signals generated by a microprocessor.

Ink can comprise colorant that is dissolved or dispersed in the ink vehicle. The ink vehicle can be aqueous or nonaqueous and the ink is referred to as aqueous or nonaqueous ink, accordingly.

Aqueous ink is advantageous because water is especially environmentally friendly. However, water is relatively volatile and aqueous-based inks can dry out quickly on the printhead. Humectants are often added to aqueous ink to retard drying, but precipitation of formulation ingredients can occur as water is lost even if the ink is not "dry". Also, images printed with colorants that are dispersible/soluble in water tend to be prone to rub-off and smear. Nonaqueous inkjet inks can be formulated with solvents having low volatility (i.e. slow drying or non-drying) and can employ colorants that provide highly rub- and smear-resist images. When jetted on paper though, nonaqueous inks tend to penetrate deeply, similar to penetrating aqueous inks, causing loss of color density, blurring and strikethrough.

Penetrating aqueous inks are formulated with a vehicle that penetrates rapidly into the printed substrate, and in so doing becomes quickly dry to the touch and therefor appears "fast drying". However, penetrating formulations also tend to move outward as well as downward which results, as was already mentioned, in blurring and strikethrough.

One way to reduce blurring and strikethrough in fast drying aqueous inks is to apply a fixing solution to the media prior to printing the ink. See, for example, U.S. Pat. Nos. 5,746,818, 6,450,632, US20020044185 and EP1258510, and commonly owned U.S. application Ser. No. 10/755,630 (filed Jan. 12, 2004, claiming priority from U.S. Provisional Application Ser. Nos. 60/440,493 (filed Jan. 16, 2003) and 60/449,760 (filed Feb. 25, 2003)), the disclosures of which are incorporated by reference herein for all purposes as if fully set forth.

Fixers commonly operate by creating an adverse charge-charge interaction with the colorant in the aqueous ink thereby precipitating and fixing the colorant on the substrate surface. This mechanism is effective with aqueous inks because the colorant is typically stabilized to dispersion or solution by an ionic mechanism. A fixer with opposite charge effectively destabilizes and fixes the colorant. However, these methods of fixation are not expected to be operable with nonaqueous inks because charge stabilization is not in effect in a low dielectric constant (nonaqueous) vehicle.

A need thus exists for fixer fluids that can improve the image quality of nonaqueous inks.

SUMMARY OF THE INVENTION

In accordance with one aspect of the present invention, there is provided an inkjet ink set comprising:

a first ink comprising a colorant in a nonaqueous vehicle; and a fixing fluid comprising a fixing agent in an aqueous vehicle.

Preferably, the ink set comprises, in addition to the fixing fluid, at least two differently colored inks, and more preferably at least four differently colored inks (such as CMYK), at least one of the colored inks being a first ink as described above. The inks other than the first ink (and fixing fluid) are preferably non-aqueous as well.

Preferably the fixing fluid when printed leaves no visible marking and/or is substantially colorless.

In accordance with another aspect of the present invention, there is provided a method of inkjet printing a substrate comprising the steps of jetting an ink set onto a substrate, the ink set comprising the ink set as set forth above.

In accordance with another aspect of the present invention, there is provided a method of inkjet printing a substrate comprising the steps of:

jetting onto an area of the substrate, in an area fill, a fixing fluid comprising a fixing agent in an aqueous vehicle; and jetting onto at least a portion of the area fill of the fixing fluid, a first ink comprising a colorant in a nonaqueous vehicle.

Preferably the fixing fluid is jetted onto the substrate before the first ink.

These and other features and advantages of the present invention will be more readily understood, by those of ordinary skill in the art, from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise.

DETAILED DESCRIPTION OF THE PREFERRED EMBODIMENTS

According to the present invention, a first ink comprising a colorant, a nonaqueous vehicle and, optionally, other ingredients such as surfactants, dispersants, binders and/or other additives and adjuvants well-known in the relevant art, is applied to a substrate in combination with a fixer (fixing) fluid comprising a fixing agent in an aqueous vehicle. Preferably, the fixer fluid is applied to the substrate first and then the ink is printed on top of the applied fixer.

Colorant for Non-Aqueous Ink

The colorant can be soluble or dispersed in the ink vehicle. Soluble colorants (such as dyes) are dissolved in the non-aqueous vehicle, while insoluble colorants (such as pigments) are stably dispersed.

Pigments, traditionally, are stabilized to dispersion by dispersing agents, such as polymeric dispersants or surfactants. More recently though, so-called "self-dispersible" or "self-dispersing" pigments (hereafter "SDP(s)") have been developed. As the name would imply, SDPs are dispersible in a vehicle without dispersants.

Suitable dyes for inkjet applications are generally well known. A representative selection of such dyes can be found, for example, in U.S. Pat. No. 5,932,631 and U.S. SIR H1967, the disclosures of which are incorporated by reference herein for all purposes as if fully set forth. The exact choice of dyes will depend upon the color reproduction and print quality requirements of the application.

Dyes used in an aqueous ink vehicle are most commonly ionic in character, which means they form an ionic (anionic or cationic depending on the specific dye) chromaphore in aqueous solution. Frequently, these dyes are only slightly soluble in a nonaqueous vehicle. However, solubility in a nonaqueous vehicle can be increased by association with an amphiphile (surfactant) of charge opposite to the chromaphore. The amount of surfactant needed can be readily determined by routine experimentation. Useful anionic surfactants may include, for example, alkylbenzene sulfonates, alkyl sulfates and higher alkyl ether sulfates, alkyl phosphates alkyl sulfosuccinates, condensation products of naphthalene sulfonic acids, and polyoxyethylene alkyl phosphates. Useful cationic surfactants may include, for example, quaternary ammonium salt type cationic surfactants or amine salt type surfactants.

Suitable pigments for inkjet applications are also generally well known. A representative selection of such pigments are found, for example, in U.S. Pat. Nos. 5,026,427, 5,086, 698, 5,141,556, 5,169,436 and 6,160,370, the disclosures of which are incorporated by reference herein for all purposes as if fully set forth. The exact choice of pigment will depend upon color reproduction and print quality requirements of the application. The pigment may be black, such as those based on carbon black, or may be colored such as those based on cyan (e.g. PB 15:3 and 15:4), magenta (e.g. PR 122 and 123), yellow (e.g. PY 128, 74 and 120).

Dispersants to stabilize the pigments to dispersion are preferably polymeric because of their efficiency. Examples of typical dispersants for nonaqueous pigment dispersions include, but are not limited to, those sold under the trade names: Disperbyk (BYK-Chemie, USA), Solsperse (Avecia) and EFKA (EFKA Chemicals) polymeric dispersants.

Suitable pigments also include SDPs. SDPs for aqueous inks are well known. SDPs for nonaqueous ink are also known and include, for example, those described in U.S. Pat. No. 5,698,016, US2001003263, US2001004871 and US20020056403, the disclosures of which are incorporated by reference herein for all purposes as if fully set forth.

It is desirable to use small pigment particles for maximum color strength and good jetting. The particle size may generally be in the range of from about 0.005 micron to about 15 microns, is typically in the range of from about 0.005 to about 1 micron, is preferably from about 0.005 to about 0.5 micron, and is more preferably in the range of from about 0.01 to about 0.3 micron.

The levels of pigment employed in the instant inks are those levels that are typically needed to impart the desired OD to the printed image. Typically, pigment levels are in the range of from about 0.01 to about 10% by weight, based on the total weight of the ink.

Nonaqueous Vehicle

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 2–4%. By definition, the nonaqueous ink of this invention will have no more than about 10%, and preferably no more than about 5%, by weight of water based on the total weight of the nonaqueous vehicle.

Fixing Fluid

The fixing fluid comprises an aqueous vehicle and an effective amount of one or more fixing agents. A fixing agent is an ingredient that initiates a change in the solubility or stability of the colorant and fixes the colorant in place in the printed image. An "effective amount" of fixing agent is an amount that is effective in achieving an improvement in strikethrough, OD, chroma and/or bleed as compared to a print that has not been fixed.

One mechanism of fixation, though not necessarily the only one, is interaction of fixing agent with a surfactant or dispersant in the nonaqueous ink. Such fixing agents can be selected from ionizable components such as polymers, surfactants, lattices (e.g. dispersed polymers) and low molecular weight organic molecules (mono- and multi-functional). Fixing agents include mono- or multi-functional carboxylate or sulfonate salts that are soluble in the aqueous vehicle, and polymer lattices such as acrylic and polyurethane polymers that are dispersed in the aqueous vehicle.

The fixing fluid is preferably formulated for high spread and quick penetration and drying. To achieve these properties, surfactants and/or penetrating solvents will typically be employed. The surface tension is preferably less than about 40 mN/m. Typically, the fixer fluid will contain about 0.1% to about 20%, more preferably about 1.0 to about 15%, fixing agent based on the total weight of the fixing fluid.

Aqueous Vehicle

"Aqueous vehicle" refers to water or a mixture of water and at least one water-miscible organic solvent (co-solvent). Selection of a suitable mixture depends on requirements of the specific application, such as desired surface tension and viscosity, the selected fixer, drying time of the fixer fluid, and the type of substrate onto which an aqueous fixer fluid will be printed. If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4–6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). The amount of glycol ether(s) and 1,2-alkanediol(s) added must be properly determined, but is typically in the range of from about 1 to about 15% by weight and more typically about 2 to about 10% by weight, based on the total weight of the fixer fluid. Surfactants may be used, typically in the amount of about 0.01 to about 5% and preferably about 0.2 to about 2%, based on the total weight of the fixer fluid.

The amount of vehicle in the fixer fluid is typically in the range of about 70% to about 99.8%, and preferably about 80% to about 99.8%, based on total weight of the fixer fluid.

Other Ingredients

Other ingredients may be formulated into the inks and fixer fluids used in accordance with this invention, to the extent that such other ingredients do not interfere with the mutually interactive (fixing) mechanisms of the ink set or the stability and jetability of the ink. Such other ingredients are generally well known in the art and include one or more of a biocide, e.g. bactericide, fungicide, algicide and the like; sequestering agent; buffering agent; corrosion inhibitor; light stabilizer; anti-curl agent; thickener; defoamer, and the like, to improve various properties or function of the ink or fixer compositions as needed.

The amount of each ingredient must be properly determined, but is typically in the range of from about 0.1 to about 15% by weight, and more typically about 0.2 to about 10% by weight, based on the total weight of the ink.

Binder may be also used and can be soluble or dispersed polymer(s), added to the ink to improve the adhesion of a pigment. Examples of polymers that can be used include polyesters, polystyrene/acrylates, sulfonated polyesters, polyurethanes, polyimides and the like. When present, soluble polymer is advantageously used at levels of at least about 0.3%, and preferably at least about 0.6%, based on the total weight of the ink. Upper limits are dictated by ink viscosity or other physical limitations.

Ink Set

A fixing fluid is an "ink" with fixing agent, but not necessarily colorant. The fixing agent in the fixing fluid of the instant invention serves to reduce colorant mobility. The fixing fluid is preferably jetted from an inkjet printhead. For the purposes of this invention, the fixing fluid is considered part of the "ink set" although, for sake of convenience and clarity, the term "ink" will generally be used herein to indicate an ink with colorant but no fixing agent. The fixing fluid can, if desired, contain colorant, but that may limit the application to the fixation of black ink only. Preferably, the fixing fluid contains substantially no colorant, and/or is substantially clear. Also, preferably, the fixing fluid can be printed on the substrate and leave no visible marking.

Preferably, the ink set comprises, in addition to the fixing fluid, at least two differently colored inks, and more preferably at least four differently colored inks (such as CMYK), at least one of the colored inks being a first ink as described above. The colorants in the inks of the ink set may all be dyes, pigments or some combination thereof. Other than the first ink, which is nonaqueous, the other colored inks in the ink set are preferably also nonaqueous.

Ink Properties

Jet velocity, drop size and stability are greatly affected by the surface tension and the viscosity of the ink. Ink jet inks typically have a surface tension in the range of about 20 dyne/cm to about 60 dyne/cm at 25° C. Viscosity can be as high as 30 cP at 25° C., but is typically somewhat lower. The inks have physical properties compatible with a wide-range of ejecting conditions, i.e., driving frequency of the piezo element, or ejection conditions for a thermal head, for either a drop-on-demand device or a continuous device, and the shape and size of the nozzle. The ink set of this invention should have excellent storage stability for long periods so as not clog to a significant extent in an ink jet apparatus. Further, it should not alter the materials of construction of the ink jet printing device it comes in contact with, and be essentially odorless and non-toxic.

Although not restricted to any particular viscosity range or printhead, the inventive ink set, because of the use of nonaqueous inks, is particularly suited to lower viscosity applications such as those required by printheads that jet small droplet volumes, e.g. less than 10 pL. Thus the viscosity (at 25° C.) of the inventive inks and fixer can be less than about 7 cps, is preferably less than about 5 cps, and most advantageously is less than about 3.5 cps.

Method of Printing

The fixing fluid will typically be deposited on the substrate before the nonaqueous ink, and preferably substantially only in areas subsequently printed with the nonaqueous ink. The area covered by the fixer (area fill) need not, however, entirely fill the area printed with the nonaqueous ink. Also, the ink need not fall (entirely) on top of the fixer. The area fill of under-printed fixer can be substantially less than the area fill of over-printed ink.

Substrate

The instant invention is particularly advantageous for printing on plain paper such as common electrophotographic copier paper.

EXAMPLES

Preparation of Magenta Pigment Dispersion

A magenta dispersion was prepared by mixing 1200 g of Magenta PR122 pigment (Ciba), 1463 g of Disperbyk 2000 (BYK-Chemie), 2337 g of Dowanol DPM (dipropylene glycol methyl ether) and milling in a media mill with 250 ml of 0.6–0.8 mm zirconia media. After milling to the desired endpoint, the media was separated and the dispersion was further diluted with Dowanol DPM to a final pigment concentration of 18.4% by weight. The viscosity was about 36 cps (Brokfield viscometer, 25° C.) and median particle size was 82 nm.

Preparation of Yellow Pigment Dispersion

A yellow dispersion concentrate was prepared by mixing the following ingredients: 125 g of Yellow PY120 (Clarient), 208 g of Disperbyk 161 (BYK-Chemie), 292 g of Dowanol PMA (propylene glycol methyl ether acetate) and milling in a media mill with 1130 ml of 0.6–0.8 mm zirconia media. After milling to the desired endpoint, the media was separated and the dispersion was further diluted with Dowanol PMA to a final pigment concentration of 20.0% by weight. The viscosity was about 26.5 cps (Brokfield viscometer, 25° C.) and median particle size was 132 nm.

General Procedure for Preparation of Acrylic Dispersion Binder

The acrylic dispersed binder can be prepared as follows. A solution prepared from deionized water (1318.0 gm), nonylphenoxy polyethyleneoxy ethyl sulfate (4 moles EO) (5.0 g) and allyl dodecyl sulfosuccinate sodium salt (7.0 gm) is added to a reaction vessel equipped with a heating mantle, stirrer, thermometer, reflux condenser and two addition funnels. The resulting mixture is heated to 85° C. with mixing. A solution comprising deinoized water (40.0 g) and ammonium persulfate (4.0 g) is placed in an addition funnel attached to the reactor. A second solution comprised of methyl methacrylate monomer (MMA) (576.0 gm), styrene monomer (Sty) (240.0 gm), 2-ethyl hexyl acrylate monomer (2-EHA) (640.0 gm), N-methylol methacrylamide monomer (MOLMAN) (87.0 gm), methacrylic acid monomer (MAA) (48.0 gm), nonylphenoxy polyethyleneoxy ethyl sulfate (14.0 gm), allyl dodecyl sulfosuccinate sodium salt (20.0 gm) and deionized water (908.0 gm) is emulsified with an Eppenbach homogenizer. This pre-emulsified solution is placed in an addition funnel attached to the reactor. Five percent of the resulting pre-emulsion is added to the reaction vessel and the temperature of the constituents in the vessel is stabilized at 85° C. The ammonium persulfate solution is then added and held for 5 minutes. The remainder of the pre-emulsion is added over a period of 90 minutes at a uniform rate. The temperature of the resulting polymerization mixture is maintained at 88–90° C. during the addition. The polymerization mixture is held at this temperature for about 1 hour. The polymerization mixture is cooled to 35° C. and neutralized with a solution of deionized water (30.0 gm), aqueous ammonium hydroxide solution (45.0 gm) and (29% aqueous solution) of methanol((((2-dihydro-5-methyl-3(2H)-oxazolyl)-1-methylethoxy)methoxy)methoxy) (4.0 gm) to achieve a pH of 8.5 to 9.0.

The resulting dispersed polymer will have the following composition: MMA/S/2-EHA/MOLMAN/HEA/MAA in a weight ratio of 36/15/40/3/3/3. The polymer typically will have a weight average molecular weight of about 500,000–1,250,000. The dispersed polymer average particle size typically is about 0.095 microns and percent weight solids is adjusted to about 35.7%.

Ink Preparation

The ink formulations are given in the following tables. Ink A and Ink B were prepared by diluting an ink concentrate with solvent to effect a pigment concentration of 3 percent, by weight. Ink C was prepared by adding Acid Blue 40 (anionic) dye to the components shown, using cetyl trimethyl ammonium bromide to achieve solubilization of the dye in the nonaqueous vehicle. Values are in weight percent of the final ink weight.

| | Ink Formulations | | |
|---|---|---|---|
| Ingredients | Ink A | Ink B | Ink C |
| Dispersion 1 (as % pigment) | — | 3.0 | — |
| Dispersion 2 (as % pigment) | 3.0 | — | — |
| Acid Blue 40 | — | — | 2.0 |
| Cetyl-trimethyl ammonium bromide | — | — | 2.0 |
| Disperbyk 161 (as % solids)[a.] | 1.5 | — | — |
| Disperbyk 2000 (as % solids)[b.] | — | 1.6 | — |
| Dowanol DPM | — | balance | — |

-continued

| | Ink Formulations | | |
|---|---|---|---|
| Ingredients | Ink A | Ink B | Ink C |
| Dowanol PMA | balance | — | — |
| n-Butanol | — | — | 10.0 |
| Isopar H | — | — | balance |

[a.] 30% solids in 6/1 methoxypropylacetate/butylglycol solvent blend.
[b.] 40% solids in 1/1 methoxypropylacetate/butylglycol solvent blend.

Preparation of Fixer Fluids

Fixer fluids were prepared by mixing ingredients together according to the following recipe.

| Fixer Formulation | % weight |
|---|---|
| Fixing Agent | As indicated |
| Glycerol | 6.8% |
| LEG-1 | 4.7% |
| 2-Pyrolidinone | 5.0% |
| Aerosol OT | 1.4% |
| DI water | Bal |

| Fixer | PH | % weight | Fixing Agent |
|---|---|---|---|
| Fixer 1 | 3.2 | 15.0 | 1,2,3,4 Butanetetracarboxylic Acid |
| Fixer 2 | 6.7 | 15.0 | Dowfax 2A1 |
| Fixer 3 | 8.2 | 15.0 | Glycolic Acid |
| Fixer 4 | 2.6 | 15.0 | Acrylic Dispersion Binder |
| Fixer 5 | 7.0 | 15.0 | Acrylic Dispersion Binder |
| Fixer 6 | 8.3 | 12.0 | Bayhdrol PU402A |

Dowfax 2A1 (Dow) is a difunctional, sulfonated surfactant
Bayhdrol PU402A (Bayer) is an anionic polyester urethane resin dispersion.

Example 1

The fixers were printed in a 1×3 inch block. Immediately thereafter, ink was printed on top of the fixer and also on an unfixed portion of the page such that there was an additional 1×3 inch block of unfixed printed ink that was used as a control. Typically, there was a period of 3 to 5 seconds between printing the fixer and feeding the page back through the printer to print the ink. Printing was done with an Epson 3000 printer. The print pattern was created in CorelDraw (Corel Corporation) and the software was used to set the area fill of the fixer and ink to 100%. Gilbert Bond (Gilbert) and Tidal MP (HammerMill) plain paper were used as substrates.

The prints were evaluated for chroma and strikethrough using a Minolta CM-3600 spectrophotometer (Minolta Corp., USA). Chroma was measured on the print side of the page and the results reported as change in chroma calculated as the ratio of chroma on the fixed/unfixed portion of the test block. A value greater than one for change in chroma indicates an increase in chroma for fixed ink relative to unfixed ink and demonstrates a beneficial result for ink/fixer combination. Chroma is summarized in the following table.

| | Change in Chroma (fixed/unfixed) | | | |
|---|---|---|---|---|
| | Gilbert Bond | | Tidal MP | |
| Fixer | Ink A | Ink B | Ink A | Ink B |
| Fixer 1 | 0.83 | 1.17 | 0.92 | 1.06 |
| Fixer 2 | 1.01 | 1.09 | 0.97 | 1.05 |
| Fixer 3 | 0.87 | 1.09 | — | 1.02 |
| Fixer 4 | 0.95 | 1.06 | 0.98 | 1.05 |
| Fixer 6 | 0.95 | 1.03 | 0.88 | 0.99 |
| Fixer 5 | 0.95 | 1.03 | 0.98 | 1.03 |

Strikethrough (S) was determined by optical density measurement on the back side of each fixed and unfixed print area in the test block. Specifically, the percentage change in strikethrough was calculated according to the following equation:

$$S = 100 \times (1 - OD_f/OD_u)$$

where $OD_f$ is the optical density of the back-side of the fixed portion of the ink test block and $OD_u$ is the optical density of the back-side of the unfixed portion of the ink test block. Positive values of S correspond to the percentage reduction in strikethrough of the fixed versus unfixed ink and demonstrates a beneficial result for ink/fixer combination. Conversely, negative values indicate percentage increase in strikethrough. Strikethrough is summarized in the following table.

| | Percent Change in Strikethrough | | | |
|---|---|---|---|---|
| | Gilbert Bond | | Tidal MP | |
| Fixer | Ink A | Ink B | Ink A | Ink B |
| Fixer 2 | 10.1 | 46.0 | 3.8 | 45.9 |
| Fixer 1 | −45.0 | 40.1 | 9.2 | 38.7 |
| Fixer 3 | 7.7 | 35.0 | −26.5 | 58.1 |
| Fixer 6 | 20.5 | 26.3 | −2.7 | 2.1 |
| Fixer 5 | −8.5 | 22.8 | −39.8 | 34.2 |
| Fixer 4 | 5.8 | 17.0 | 7.4 | 28.8 |

Results show an improvement in chroma and/or reduction in strikethrough can be obtained through the use of the inventive ink/fixer combinations. Of course, as is to be expected, some judgment and routine optimization is needed to choose the combinations, which are most effective. Also, although not quantified, when strikethrough was reduced, bleed tended to decrease and edge acuity improved.

Example 2

In this example, the inventive ink set is comprised of Ink C and Fixer 1. In lieu of printing a sample, the fixing action was assessed by placing a drop of Ink C on top of approximately 1 mL of Fixer Fluid 1 without agitation. Instantly upon addition, the upper phase of the nonaqueous ink "reacted" to form numerous, highly localized, areas of intense blue color. This suggests that the colorant stability had broken by contact with the fixer and, if printed together, the colorant would become fixed on the substrate.

The invention claimed is:

1. An inkjet ink set comprising:
   a first ink comprising a colorant in a nonaqueous vehicle; and
   a fixing fluid comprising a fixing agent in an aqueous vehicle.

2. The ink set of claim 1, further comprising at least four differently colored inks, at least one of the colored inks being a first ink.

3. The ink set of claim 1, wherein the colorant in the first ink is selected from the group consisting of a pigment and a dye.

4. The ink set of claim 1, wherein the colorant in the first ink is a self-dispersing pigment.

5. The ink set of claim 1, wherein the nonaqueous vehicle has no more than about 10% by weight of water based on the total weight of the nonaqueous vehicle.

6. The ink set of claim 1, wherein the fixing agent is an ionizable component.

7. The ink set of claim 2, wherein the colorant in the first ink is selected from the group consisting of a pigment and a dye; the nonaqueous vehicle has no more than about 10% by weight of water based on the total weight of the nonaqueous vehicle; and wherein the fixing agent is an ionizable component.

8. The ink set of claim 7, wherein the colorant in the first ink is a self-dispersing pigment.

9. A method of inkjet printing a substrate comprising the steps of jetting an ink set onto a substrate, the ink set comprising:
   a first ink comprising a colorant in a nonaqueous vehicle; and
   a fixing fluid comprising a fixing agent in an aqueous vehicle.

10. The method of claim 9, wherein the ink set further comprising at least four differently colored inks, at least one of the colored inks being a first ink.

11. The method of claim 9, wherein the colorant in the first ink is selected from the group consisting of a pigment and a dye.

12. The method of claim 9, wherein the colorant in the first ink is a self-dispersing pigment.

13. The method of claim 9, wherein the nonaqueous vehicle has no more than about 10% by weight of water based on the total weight of the nonaqueous vehicle.

14. The method of claim 9, wherein the fixing agent is an ionizable component.

15. The method of claim 10, wherein the colorant in the first ink is selected from the group consisting of a pigment and a dye; the nonaqueous vehicle has no more than about 10% by weight of water based on the total weight of the nonaqueous vehicle; and wherein the fixing agent is an ionizable component.

16. The method of claim 15, wherein the colorant in the first ink is a self-dispersing pigment.

17. The method of claim 9, wherein the fixing fluid is jetted onto the substrate before the first ink.

18. The method of claim 9, wherein the area fill of the fixing fluid is less than the area fill of the first ink.

19. The method of claim 17, wherein the area fill of the fixing fluid is less than the area fill of the first ink.

* * * * *